(12) United States Patent
Buckman et al.

(10) Patent No.: US 7,978,981 B2
(45) Date of Patent: Jul. 12, 2011

(54) STRUCTURE AND APPARATUS FOR A VERY SHORT HAUL, FREE SPACE, AND FIBER OPTIC INTERCONNECT AND DATA LINK

(75) Inventors: Lisa A. Buckman, San Francisco, CA (US); Frank H. Peters, San Jose, CA (US); Brian E. Lemoff, Union City, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 2362 days.

(21) Appl. No.: 10/080,944

(22) Filed: Feb. 22, 2002

(65) Prior Publication Data

US 2004/0207926 A1    Oct. 21, 2004

(51) Int. Cl.
*H04B 10/00* (2006.01)

(52) U.S. Cl. ........ 398/131; 398/129; 398/118; 398/140; 398/156

(58) Field of Classification Search .............. 398/79–88, 398/96, 118–131, 156, 164, 135–139
See application file for complete search history.

(56) References Cited

U.S. PATENT DOCUMENTS

| | | | | |
|---|---|---|---|---|
| 3,573,433 | A * | 4/1971 | Harris | 365/127 |
| 3,633,035 | A * | 1/1972 | Uchida et al. | 398/101 |
| 3,785,736 | A * | 1/1974 | Spitz et al. | 356/71 |
| 4,052,706 | A * | 10/1977 | Spitz et al. | 365/235 |
| 4,549,313 | A * | 10/1985 | Rozenwaig | 398/57 |
| 4,641,273 | A * | 2/1987 | Casasent | 708/816 |
| 4,651,297 | A * | 3/1987 | Schlunt | 708/816 |
| 4,705,344 | A * | 11/1987 | Hinton et al. | 359/15 |
| 4,939,630 | A * | 7/1990 | Kikuchi et al. | 362/268 |
| 5,078,499 | A * | 1/1992 | LaMarche | 359/19 |
| 5,081,637 | A * | 1/1992 | Fan et al. | 372/72 |
| 5,093,879 | A * | 3/1992 | Bregman et al. | 385/93 |
| 5,243,619 | A * | 9/1993 | Albers et al. | 372/97 |
| 5,291,324 | A * | 3/1994 | Hinterlong | 398/54 |
| 5,513,201 | A * | 4/1996 | Yamaguchi et al. | 372/75 |
| 5,546,209 | A * | 8/1996 | Willner et al. | 398/43 |
| 5,557,693 | A * | 9/1996 | Stevens et al. | 385/24 |
| 5,650,612 | A * | 7/1997 | Criswell et al. | 250/226 |

(Continued)

FOREIGN PATENT DOCUMENTS

WO    WO 00/16503    3/2000

(Continued)

OTHER PUBLICATIONS

Strzelecka, E. M. et al., "Monolithic Integration of an Array of Multiple-Wavelength Vertical-Cavity Lasers with a Refractive Microlens for Optical Interconnections", Lasers and Electro-Optics Society Annual Meeting, Nov. 18, 1996, pp. 271-272.

*Primary Examiner* — Agustin Bello (57) ABSTRACT

A low cost, high speed, short haul, optic interconnect and data link which employs an array of vertical cavity surface emitting laser (VCSEL) arrays through which several optical signals are simultaneously transmitted through collimating optics that generate multiple, multiple-wavelength optical signals. Each combined optical signal is transmitted to a receiver array comprising a plurality of optical filters and photodetector arrangements that have a number of sections, each having an optical filter to pass a specific optical wavelength, and a mating photodetector element to convert the specific optical signal to an electrical signal. The signals may be coupled between the transmitter array and the receiver array through free space or through optical fibers.

16 Claims, 5 Drawing Sheets

U.S. PATENT DOCUMENTS

| | | | | |
|---|---|---|---|---|
| 5,781,671 | A * | 7/1998 | Li et al. | 385/17 |
| 5,787,107 | A * | 7/1998 | Leger et al. | 372/71 |
| 5,793,906 | A * | 8/1998 | Huang | 385/17 |
| 5,857,042 | A * | 1/1999 | Robertson et al. | 385/33 |
| 5,914,976 | A | 6/1999 | Jayaraman et al. | |
| 5,920,664 | A * | 7/1999 | Hirabayashi et al. | 385/16 |
| 5,969,872 | A * | 10/1999 | Ben Oren et al. | 359/621 |
| 5,986,788 | A * | 11/1999 | Sasaki et al. | 398/118 |
| 6,005,717 | A * | 12/1999 | Neuberger et al. | 359/619 |
| 6,044,096 | A * | 3/2000 | Wolak et al. | 372/36 |
| 6,091,537 | A * | 7/2000 | Sun et al. | 359/248 |
| 6,117,193 | A * | 9/2000 | Glenn | 29/25.01 |
| 6,160,664 | A * | 12/2000 | Du et al. | 359/628 |
| 6,175,452 | B1 * | 1/2001 | Ullmann et al. | 359/641 |
| 6,195,485 | B1 * | 2/2001 | Coldren et al. | 385/49 |
| 6,215,598 | B1 * | 4/2001 | Hwu | 359/641 |
| 6,253,004 | B1 * | 6/2001 | Lee et al. | 385/31 |
| 6,326,600 | B1 * | 12/2001 | Christensen et al. | 250/201.1 |
| 6,353,502 | B1 * | 3/2002 | Marchant et al. | 359/626 |
| 6,356,577 | B1 * | 3/2002 | Miller | 372/107 |
| 6,367,989 | B1 * | 4/2002 | Hartman et al. | 385/89 |
| 6,400,513 | B1 * | 6/2002 | Southwell | 359/641 |
| 6,434,308 | B1 * | 8/2002 | Trezza | 385/119 |
| 6,486,984 | B1 * | 11/2002 | Baney et al. | 398/212 |
| 6,493,148 | B1 * | 12/2002 | Anikitchev | 359/634 |
| 6,509,992 | B1 * | 1/2003 | Goodwill | 398/131 |
| 6,516,011 | B1 * | 2/2003 | Treusch | 372/29.01 |
| 6,527,456 | B1 * | 3/2003 | Trezza | 385/89 |
| 6,530,700 | B2 * | 3/2003 | Williams | 385/92 |
| 6,545,425 | B2 * | 4/2003 | Victor | 315/169.3 |
| 6,556,352 | B2 * | 4/2003 | Wang et al. | 359/641 |
| 6,574,398 | B2 * | 6/2003 | Coldren et al. | 385/49 |
| 6,583,904 | B1 * | 6/2003 | Mahlab et al. | 398/129 |
| 6,591,042 | B2 * | 7/2003 | Tatah | 385/43 |
| 6,666,590 | B2 * | 12/2003 | Brosnan | 385/93 |
| 6,683,727 | B1 * | 1/2004 | Goring et al. | 359/639 |
| 6,695,493 | B2 * | 2/2004 | Ciemiewcz | 385/89 |
| 6,771,686 | B1 * | 8/2004 | Ullman et al. | 372/92 |
| 6,775,308 | B2 * | 8/2004 | Hamster et al. | 372/28 |
| 6,775,480 | B1 * | 8/2004 | Goodwill | 398/158 |
| 6,853,812 | B2 * | 2/2005 | Mays, Jr. | 398/130 |
| 6,889,010 | B2 * | 5/2005 | Trezza | 398/130 |
| 6,909,554 | B2 * | 6/2005 | Liu et al. | 359/626 |
| 7,116,694 | B2 * | 10/2006 | Peters et al. | 372/50.12 |
| 7,155,129 | B2 * | 12/2006 | Bringans et al. | 398/131 |
| 7,446,298 | B1 * | 11/2008 | Stone | 250/216 |
| 2001/0043381 | A1 * | 11/2001 | Green et al. | 359/172 |
| 2002/0009258 | A1 | 1/2002 | Coldren et al. | |
| 2003/0147652 | A1 * | 8/2003 | Green et al. | 398/118 |
| 2004/0207926 | A1 * | 10/2004 | Buckman et al. | 359/642 |

FOREIGN PATENT DOCUMENTS

| | | |
|---|---|---|
| WO | WO01/98808 | 5/2001 |
| WO | WO01/50164 | 7/2001 |
| WO | WO02/29457 | 4/2002 |

* cited by examiner

STRUCTURE AND APPARATUS FOR A VERY SHORT HAUL, FREE SPACE, AND FIBER OPTIC INTERCONNECT AND DATA LINK

BACKGROUND OF THE INVENTION

1. Field of the Invention

This invention relates generally to optical communication systems, and more particularly to an improved structure and apparatus for a low-cost, high-performance, free space or fiber optic interconnect and data link.

2. Discussion of the Prior Art

Optical systems are presently being used for high bandwidth, high-speed voice and video communications. As a result, optical systems are one of the fastest growing constituents in the communications systems market. The expression "optical system," as used herein, relates to any system that uses an optical signal to transport data and or application content across an optical medium. Previously, most optical systems were configured as single channel systems carrying a single wavelength over an optical medium such as a fiber optic cable or some form of free space interconnect. As the demand for broadband services grows, the increase in traffic has led to a need for greater channel carrying capacity. Due to the high cost of expanding the transport facilities of an optical communications or network system, increasing the capacity by laying more cable, for example, is generally impractical. Thus, it has become important to develop a technique that could expand the channel-carrying capacity of these existing facilities.

One technique for increasing the capacity of an optical communications or network system is to multiplex the data streams or signals from a number of sources. In general, multiplexing divides the available bandwidth of a common transport medium into fractional units that can be accessed by individual sources. With time division multiplexing (TDM), for example, these fractional units are referred to as time slots. TDM is a scheme by which the contents from multiple sources are divided into a plurality of segments. Each segment is then inserted into a pre-assigned time slot and transmitted via a composite carrier signal in a predictable, specified order via a single optical channel. At the other end, the data streams are then reconstructed and routed to the appropriate receiver. While this is a useful technique for conveying data or content from a plurality of sources on a single channel, the dispersion and non-linearity of the optical media tend to limit the performance and transmission capacity of the channel.

A practical method to increase the total capacity of a transport medium beyond the capacity of a single channel is to create a number of signals or channels having different non-interfering wavelengths. These signals or channels are then transmitted through a single optical transport medium such as fiber optic cable or, in the case of some very short-haul optical communications systems, a free space interconnect by using a technique called wavelength division multiplexing.

Wavelength division multiplexing (WDM) converts the optical signals from several sources into a set of carrier channels, each having a specified, non-interfering wavelength, that can be simultaneously transmitted over a single optical fiber or free space interconnect. Since each channel is completely isolated from the others, these discrete channels are simply combined or mixed, thereby creating an array of "virtual optical channels" that can be transported through a single optical transport medium.

Figure 1:
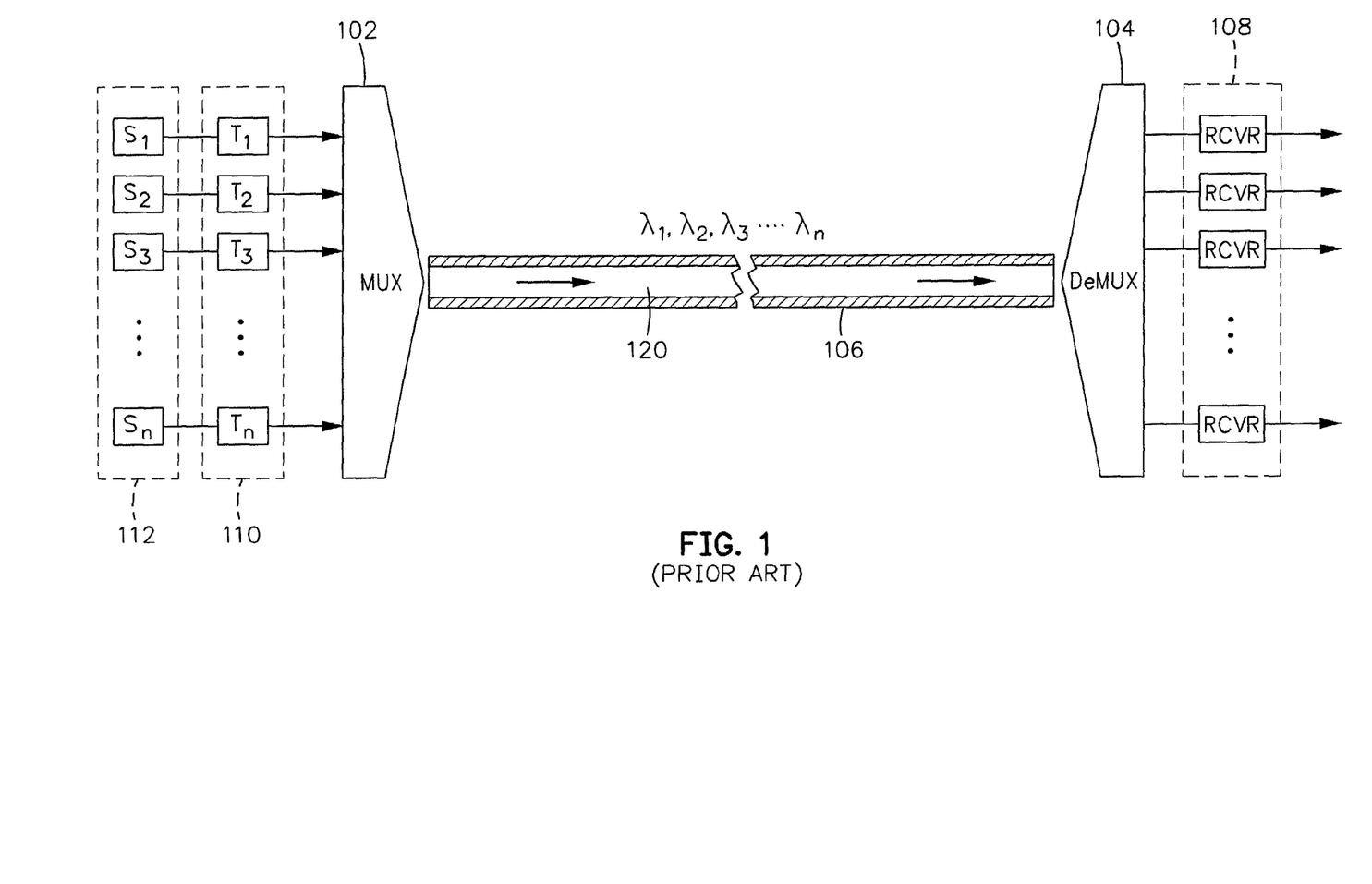
FIG. 1 is a block diagram illustrating a typical WDM-based optical communications system as implemented in the prior art.

FIG. 1 is a block diagram illustrating a typical WDM-based optical communications system as implemented in the prior art. In a typical WDM optical system, wavelength multiplexing and demultiplexing components are used to combine and separate the individual wavelengths, respectively. As FIG. 1 shows, a plurality of transmitters 110 direct a plurality of signals, each having a different wavelength ($\lambda_1, \lambda_2, \lambda_3, \ldots \lambda_n$) from an array of data sources 112 to multiplexer 102 that combines these signals into a single multiplexed signal 120. The multiplexed signal is then transmitted through a fiber optic cable 106. At the receiving end, demultiplexer 104 receives and separates the combined signal into individual signals according to wavelength ($\lambda_1, \lambda_2, \lambda_3, \ldots \lambda_n$) and then directs these signals to the appropriate receivers 108. For a signal to be properly demultiplexed, a single optical channel is selected from the multiplexed optical signal. The demutilplexer is designed to separate the individual wavelengths based on the precise center wavelength and bandwidth for each channel. One method of demultiplexing is to use an optical splitter followed by optical filters to select the precise bandwidth of each channel.

The advantage of WDM is that it significantly expands the capacity of a fiber optic communications facility. For example, a four-channel WDM optical system will experience as much as a four-fold increase in capacity and performance as compared to a conventional single channel system. The problem, however, is that such an arrangement requires a precise correspondence between the wavelength of each optical signal and the wavelength selection element for each channel in order to avoid "crosstalk," that is, interference between adjacent channels. Also, most of the conventional multiplexing and demultiplexing components used in such systems or networks tend to suffer from performance deficiencies requiring some form of amplification to be added to the configuration. As a result, these systems are very complex and have a significant impact on the cost of increasing the capacity of an existing optical communications or network system.

Figure 2:
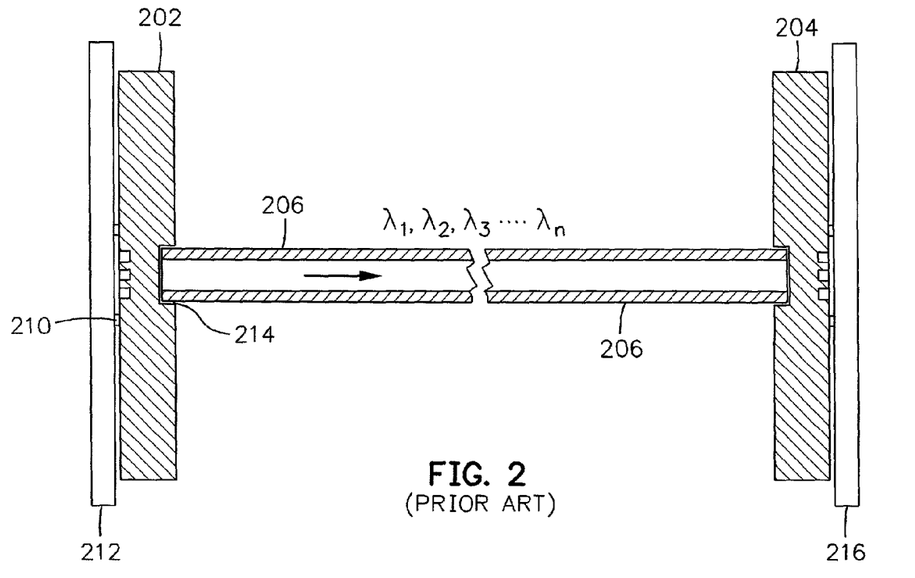
FIG. 2 is a schematic representation of a prior art scheme for a WDM optical data link.

FIG. 2 is a schematic diagram that illustrates a prior art scheme for a WDM optical data link. One approach used to reduce the cost of a WDM optical data link is an array of optical signals that are transmitted by a monolithic, very tightly coupled VCSEL-based transmitter array 202 to a channel-matched, wavelength-selective, monolithic photodetector array 204 through a single multimode fiber optic cable 206 without the use of either a waveguide combiner or distributor. The transmitter array and the detector array are mounted to respective substrates 212 and 216 by suitable conductive means such as solder balls 210. This is accomplished by circularly arranging all the elements of VCSEL-based transmitter array to be in line with the core of fiber optic cable 206 so that the entire VCSEL-based transmitter array is simultaneously interfaced to the fiber optic cable. An adhesive bond 214 such as epoxy resin is used to couple both VCSEL-based transmitter array 202 and photodetector 204 array to either end of fiber optic cable 206. It should be noted that the VCSEL-based transmitter array and the photodetector array are designed in a conventional cylindrical shape. Additionally, transmitter array 202 and photodetector array 204 have flat planar-surface structures that facilitate proper alignment with fiber optic cable 206. The disadvantage of this technique is that if either the VCSEL-based transmitter array or the photodetector array is not precisely aligned with the fiber optic cable or does not exactly match the outer circumference of the fiber optic cable, the optical data link will experience a significant level of loss, thus reducing the overall performance of the optical link. Also, the VCSEL-based monolithic transmitter array and monolithic photodetector array must have wavelengths that match. Otherwise significant crosstalk and interference may occur at the receiver.

Similarly, in a short haul, free space communications environment, wavelength dependent multiplexing and demultiplexing components are used to direct the signals from a transmitter array through an open space to a photodetector array at the other end. As before, an array of transmitter elements, each emitting an optical signal having a different wavelength, is directed to a combiner or multiplexer. The combiner merges the received signals into an aggregate signal and transmits it across the specified open space or channel to a corresponding demultiplexer. At the receiving end, the optical signals are split and directed through separate optical paths, and the separated optical signals are then detected by a photodetector that is tuned for a particular wavelength.

Like the fiber optic based communications facilities described above, a short haul, free space facility that employs an optical multiplexer and demultiplexer will also experience a performance deficiency. In this case, it can be as much as a 12 dB loss per channel for a four-channel WDM link. In addition, such a configuration requires precise alignment between the transmitter and the wavelength selection element of each detector in order to avoid interference between adjacent channels. Another disadvantage is that if the transmission elements of a transmitter array are too tightly grouped together, it will also generate additional signal interference and electrical crosstalk due to interference from the driving signals.

In view of the foregoing, there exists a need for a two-dimensional, free space optical data link or interconnect that employs an array of vertical cavity surface emitting lasers (VCSELs) to transmit multiple optical signals simultaneously to an array of detectors that selectively receive the transmitted optical signals. Ideally, such an optical interconnect is more cost effective, provides greater capacity and higher performance than other conventional optical interconnects.

SUMMARY OF THE INVENTION

In accordance with the primary purpose of the invention, as embodied and described herein, the invention relates to a cost effective, simplified implementation of a very short distance, free space optical interconnect and data link with improved capacity. The two-dimensional, free space optical link includes a transmitter array constructed with a plurality of multiple-wavelength transmitter elements that broadcast a specified set of multiplexed optical signals, comprising a number of channels at different wavelengths, through a short haul, free space channel to a receiver array. The receiver array has a corresponding number of filter/detector elements that separate the received multiplexed signals into several individual channels, each according to its wavelength. Each transmitter element has collimating optics and a vertical cavity surface emitting laser (VCSEL) array. The VCSEL array is a tightly bound structure of at least four VCSELs, each emitting an optical signal having a different wavelength. This tightly bound array may be constructed from discrete VCSELs and assembled onto a substrate, or may be a monolithic design. The collimating optics are positioned directly in front of each VCSEL array to collimate the emitted optical signals and direct them as a multiplexed signal to the receiver array at the other end. By using multiple VCSELs in each transmitter element and an equivalent number of detectors in the receiver array, multiple signals may be transmitted over the same short distance, free space link simultaneously. The receiver array may be constructed using discrete photodetectors and filters assembled into an array, or using monolithic photodiode arrays with filters attached.

In an alternative embodiment, optical fibers may be used instead of free space to couple the transmitted optical signals to the receiver.

Advantages of the invention will be set forth, in part, in the description that follows and, in part, will be understood by those skilled in the art from the description. The advantages of the invention will be realized and attained by means of the elements and combinations particularly pointed out in the appended claims and equivalents.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

The present invention now will be described more fully with reference to the accompanying drawing, in which the preferred embodiments of the invention are shown. The present invention may, however, be embodied in many different forms and should not be construed as limited to the embodiment set forth herein. Rather these embodiments are provided so that this disclosure will be thorough and complete and will fully convey the invention to those skilled in the art.

Figure 3:
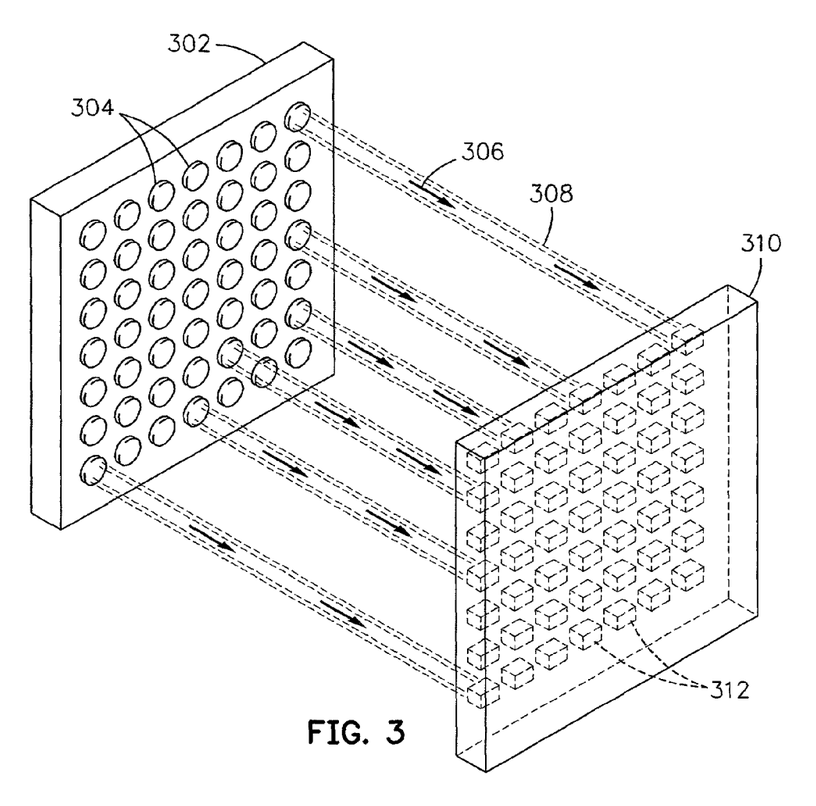
FIG. 3 is a schematic diagram illustrating a two-dimensional free space optical link constructed in accordance with the present invention.

FIG. 3 is a schematic diagram illustrating two-dimensional, free space optical link comprised of a two-dimensional transmitter array 302 and a two-dimensional receiver array 310. Transmitter array 302 is constructed of a plurality of multi-wavelength transmitter elements 304. Each multi-wavelength transmitter element broadcasts a multiplexed optical signal 306, comprising a number of channels at different wavelengths, through short haul, free space channel 308 to receiver array 310. Receiver array 310 is comprised of a corresponding number of filter/detector elements 312, each of which splits the multiplexed signal into several individual channels according to its wavelength.

Figure 4:
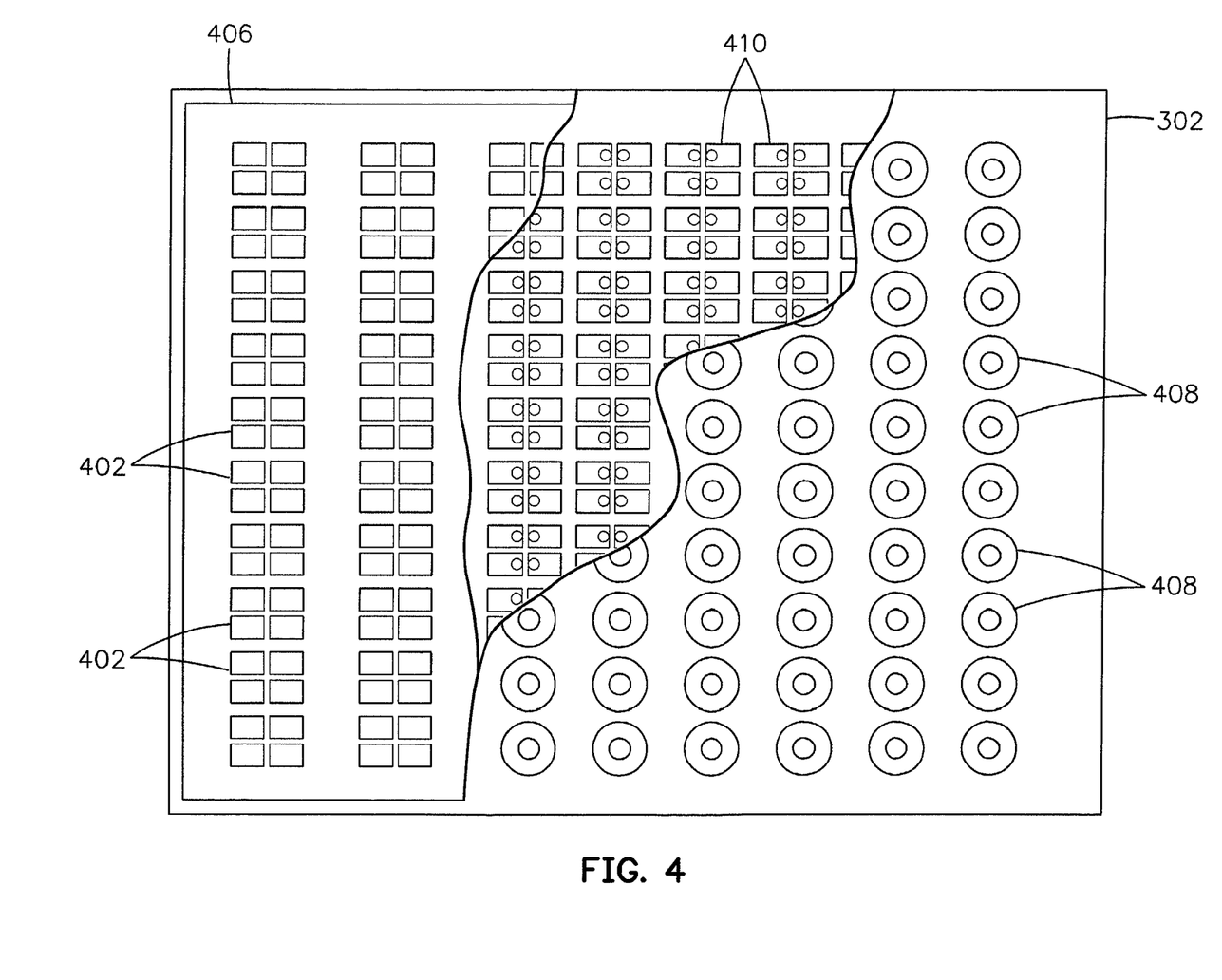
FIG. 4 is a schematic diagram illustrating the operative components of a two-dimensional transmitter array in accordance with the present invention.

FIG. 4 shows the transmitter array of the invention. Two-dimensional transmitter array 302 comprises a set of collimating optics 408 and a corresponding set of vertical cavity surface emitting laser (VCSEL) arrays 410 that have been mounted to substrate 406, such as by a solder bond 402. Each collimating optical element 408 is positioned directly over each of the VCSEL arrays. VCSEL array 410 is a tightly bound structure of four VCSELs, each emitting an optical signal with a different wavelength. Either bottom-emitting or top-emitting VCSELs can be used for this application, but in this case, bottom-emitting VCSELs are preferred. This is due in part to the fact that bottom-emitting VCSELs allow the flip-chip solder bonding technique to be used to affix VCSEL array 410 onto substrate 406, which allows for convenient access to the contact pads for the VCSELs which are used to transmit the electrical data. The use of discrete VCSELs rather than a monolithic array of VCSELs reduces the thermal crosstalk between channels.

Figure 5:
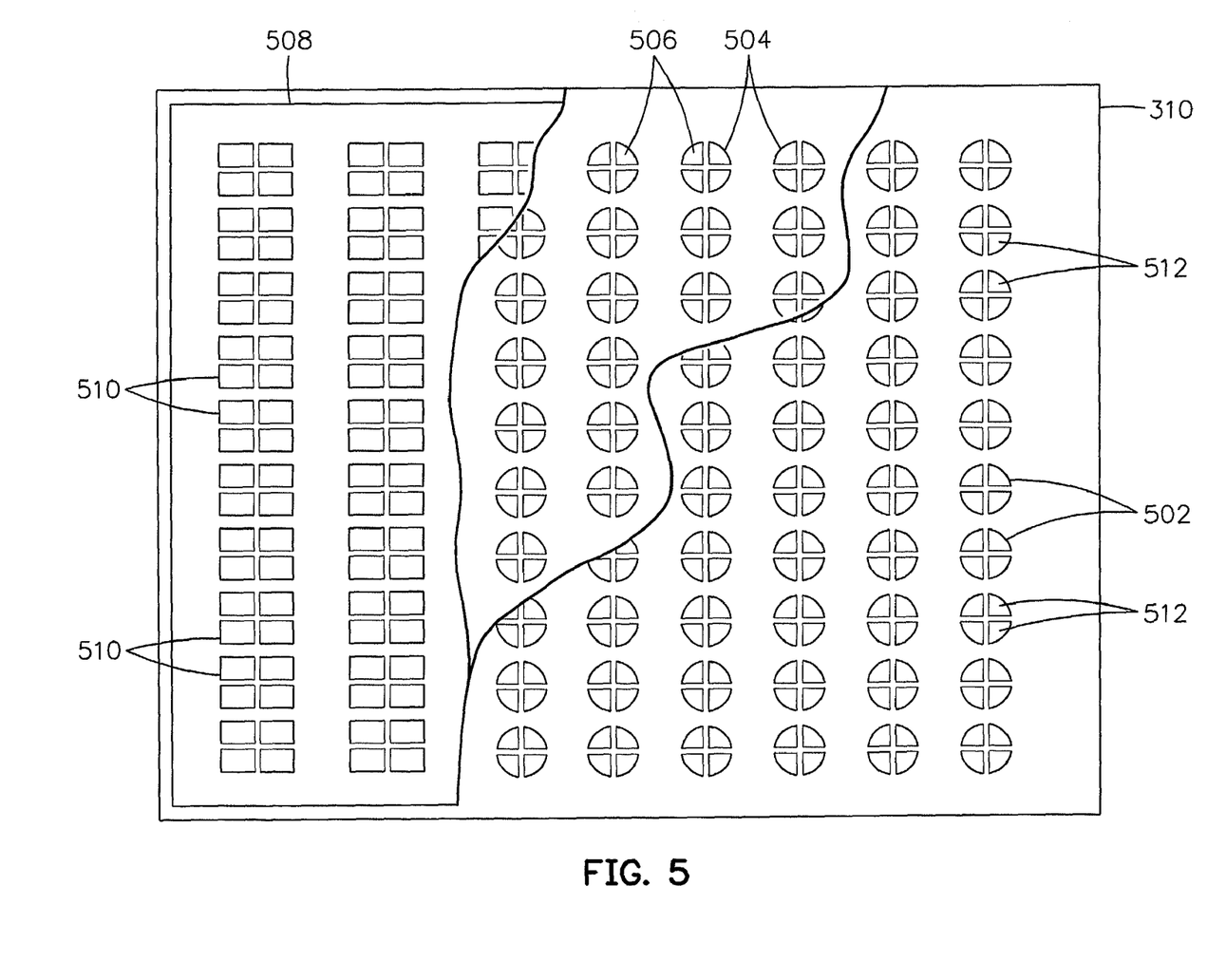
FIG. 5 is a schematic diagram illustrating the operative components of a two-dimensional receiver array in accordance with the present invention.

FIG. 5 shows the receiver array of the invention. Receiver array 310 comprises a plurality of filters 502 and a matching set of photodetectors 504 in arrangements that are affixed to substrate 508 by suitable means such as solder bond 510. Each filter element 502 and each photodetector element 504 comprises four electrically isolated segments designed to facilitate an optical signal of specified wavelength that has been broadcast through a short haul, free space channel from one of the transmitter arrays. Each segment of filter 502 has a filter element 512 that has been configured to select a specific signal having a particular wavelength. Similarly, each photodetector 504 has a corresponding detector element 506 to detect one portion of the transmitted combined optical signal, thus isolating and converting only one optical signal having a specific wavelength. The filter may be thought of as a pie-shaped segment, as shown, of a partitioned filter. It may also be comprised of separate segments mounted together on the corresponding detector or on an optically transparent surface to which both the filters and the detectors are mounted.

Figure 6:
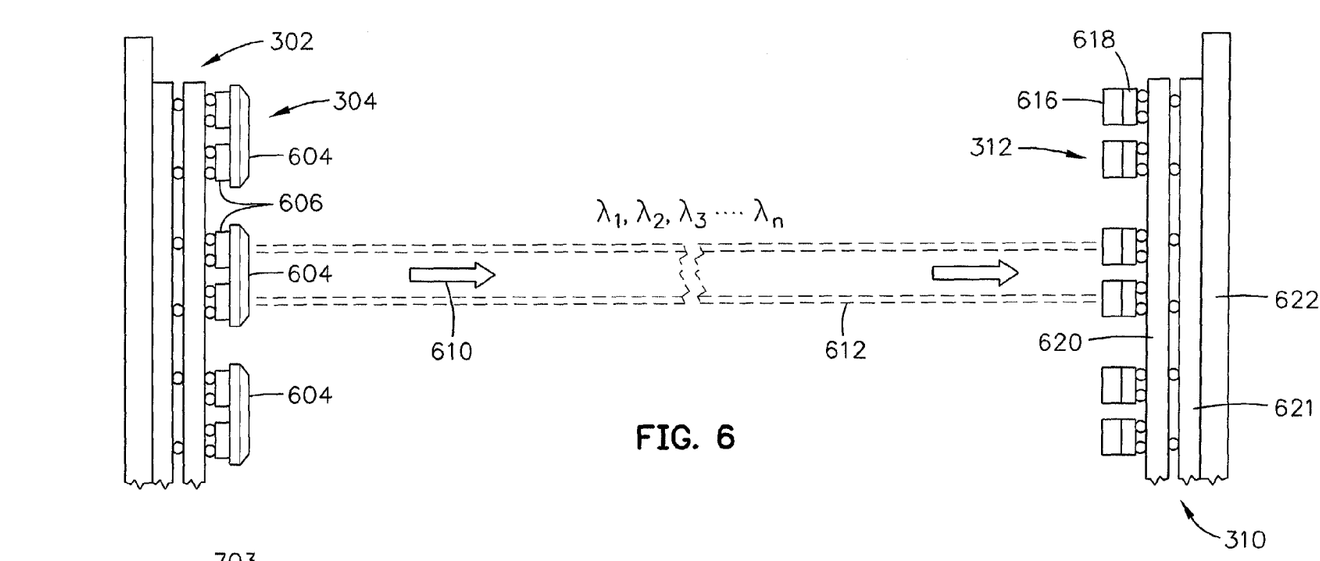
FIG. 6 details the operative elements of the two-dimensional optical interconnect of FIG. 3.

Reference is now made to FIG. 6, showing the two-dimensional optical interconnect of the invention. Transmitter array 302 comprises transmitter elements 304 (see FIG. 3), each having a tightly bound cluster of VCSELs 606 (shown as four in FIG. 4), each transmitting an optical signal at a different wavelength, and collimating optics 604. The collimating optics are designed to combine the optical signals emitted from each of the VCSELs into a single broadcasted signal 610 that is, in turn, transmitted through a short haul, free space channel 612 to receiver array 310. Positioning the emitters of each VCSEL 606 in a tight rectangular cluster and forcing the emitted signal through collimating optics allow multiple optical channels to be transmitted over a free space channel without the need of either an optical multiplexer or a demultiplexer.

Receiver array 310 in FIG. 6 comprises tightly coupled sets of filter/detectors 312 comprised of multiple elements. Each filter/detector element consists of a tightly bound cluster of filters 616 and photodetecters 618. As optical signal 610 hits receiver array 310, each filter 616 in the array passes the appropriate optical signal in accordance with an assigned wavelength, permitting the desired signal to be passed through to photodetector 618 while reflecting the rest. Here, filter 616 is used as a wavelength-selecting device, only accepting the precise bandwidth of a specified optical signal, thus ensuring that each signal is properly selected. Responsive to the signal received through filter 616, photodetector 618 converts the optical signal into an electrical signal for distribution through substrate 620 to a set of electronics 621, such as a receiver integrated circuit (IC), attached to backplane 622 that is able to transmit the converted signal to an appropriate receiver or source (not shown). As with the transmitter side, the use of substrate 620 is optional. It is possible that the filter/detector assemblies can be mounted directly to the receiver IC.

Figure 7:
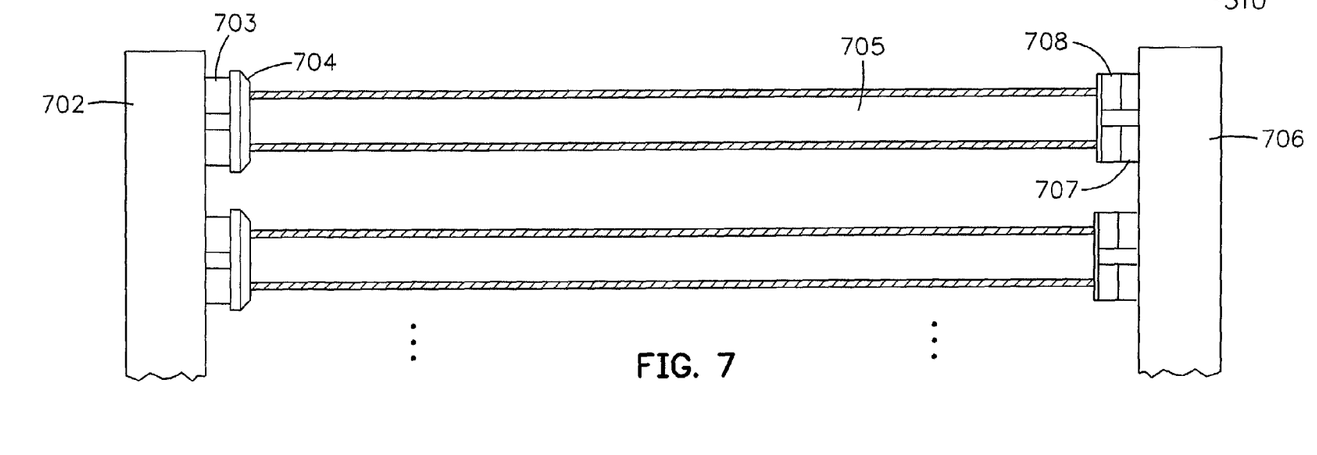
FIG. 7 is a simplified side view, similar to FIG. 6, showing a two-dimensional array of optical fibers for the optical interconnect of FIG. 3.

FIG. 7 simply shows that the optical interconnection between transmitter 702 and receiver 706 may be through optical fibers 705. There is one fiber for each element of transmitter array 703 which transmits the signal through collimating optics 704. The signals are selected by filters 708 and detected by detectors 707 on receiver IC 706. The FIG. 7 version otherwise operates the same as the FIG. 6 apparatus.

It should be noted that the free space distance may be between racks in a communication apparatus and could be as small a distance as physically practical, possibly 0.5 inch, and as distant as practical for line of sight coupling, possibly approximately one meter. However, the FIG. 7 embodiment, using optical fiber coupling, could be any practical length and is not limited to line of sight.

Although not shown, focusing optics may be employed on the receiver side of the apparatus of the invention, in addition to the collimating optics shown on the emitter side.

While the preferred embodiments of the present invention have been described, it is understood that those skilled in the art, both now and in the future, may make various improvements and enhancements which fall within the scope of the claims which follow, and equivalents.

What is claimed is:

1. A two-dimensional free space optical link comprising:
   an array of tightly-coupled, multi-wavelength arrays of vertical cavity surface emitting lasers (VCSELs), operating at predetermined wavelengths;
   collimating optics for collimating the optical signals emitted from each said multi-wavelength array of VCSELs into a single uniform optical signal; and an array of tightly-coupled optical receiver arrays, each respective receiver array being configured to receive the signals from a respective one of said VCSEL arrays, wherein the wavelengths of the received signals received by the respective optical receiver array generally match the wavelengths of the signals transmitted by the respective one of the VCSEL arrays such that multiple optical wavelengths can be simultaneously communicated at high-speed from one of the respective VCSEL arrays to one of the respective receiver arrays across a very short haul channel.

2. The optical link recited in claim 1, wherein said VCSELs are selected from the group consisting of bottom-emitting VCSELs and top-emitting VCSELs.

3. The optical link recited in claim 1, wherein said VCSEL array is configured as a tightly-bound cluster of VCSELs.

4. The optical link recited in claim 3, wherein the emitting elements of each VCSEL in said cluster form a small group positioned at the focal point of said collimating optics.

5. The optical link recited in claim 1, wherein said tightly-coupled optical receiver array of the said receiver arrays comprise partitioned optical filters and mating photodetectors.

6. The optical link recited in claim 5, wherein said optical filters of each said optical receiver array further comprise multiple segments, each segment having an individual filter element designed to pass a transmitted optical signal with a specific wavelength range.

7. The optical link recited in claim 5, wherein said photodetectors of each said optical receiver array further comprise multiple segments, each segment having an individual photodetector element that converts the transmitted optical signal received from each said filter element to an electrical signal.

8. The optical link recited in claim 1, wherein said short haul channel is free space.

9. The optical link recited in claim 1, wherein said short haul channel is optical fibers.

10. A two-dimensional optical link comprising:
an array of tightly-coupled, multi-wavelength arrays of vertical cavity surface emitting lasers (VCSELs), transmitting signals at predetermined wavelengths;
collimating optics for collimating the optical signals emitted from each said multi-wavelength array of VCSELs into a single uniform optical signal; and an array of tightly coupled optical receiver arrays, each respective receiver array being configured to receive a signal from a respective one of said VCSEL arrays, wherein the wavelengths of the signals received by the respective optical receiver array generally match the wavelengths of the signals transmitted by the respective one of the VCSEL arrays such that multiple optical wavelengths can be simultaneously communicated at high-speed from said VCSEL arrays to said receiver arrays across a channel.

11. The optical link recited in claim 10, wherein the signals from said VCSEL arrays are transmitted across the channel, to said receiver arrays through free space.

12. The optical link recited in claim 10, wherein the signals from said VCSEL arrays are transmitted across the channel to said receiver arrays through optical fibers.

13. A method of creating a two-dimensional optical link, the method comprising:
assembling an array of tightly-coupled, multi-wavelength arrays of vertical cavity surface emitting lasers (VCSELs), wherein the VCSEL emitters in the array are arranged in a regular pattern and each VCSEL emitter in the array of tightly-coupled VCSELs is set for a different emissive wavelength;
collimating the optical signals emitted from each said multi-wavelength array of VCSELs into a single uniform optical signal;
fabricating an array of tightly-coupled optical receiver arrays, wherein each receiver array comprises a plurality of optical filters and mating photodetector arrangements; and
mounting the VCSEL emitter array and receiver array onto respective transmitter and receiver electronic circuits configured to receive the respective emitter and receiver arrays.

14. The method recited in claim 13, wherein each optical filter and photodetector arrangement has a plurality of segments, each segment having an individual filter and a mating photodetector element where each filter is configured to pass one wavelength and each photodetector converts a specific optical signal with a specified wavelength to an electrical signal.

15. The method recited in claim 13, and further comprising transmitting signals from the emitter array to the receiver array through free space.

16. The method recited in claim 13, and further comprising transmitting signals from the emitter array to the receiver array through optical fibers.

* * * * *